Oct. 4, 1932.   A. W. MORRIS   1,880,458
MECHANISM FOR AND METHOD OF MANUFACTURING PULP ARTICLES
Original Filed Feb. 5, 1929   7 Sheets-Sheet 1

INVENTOR
Albert W. Morris
BY
Mock & Blum
ATTORNEYS

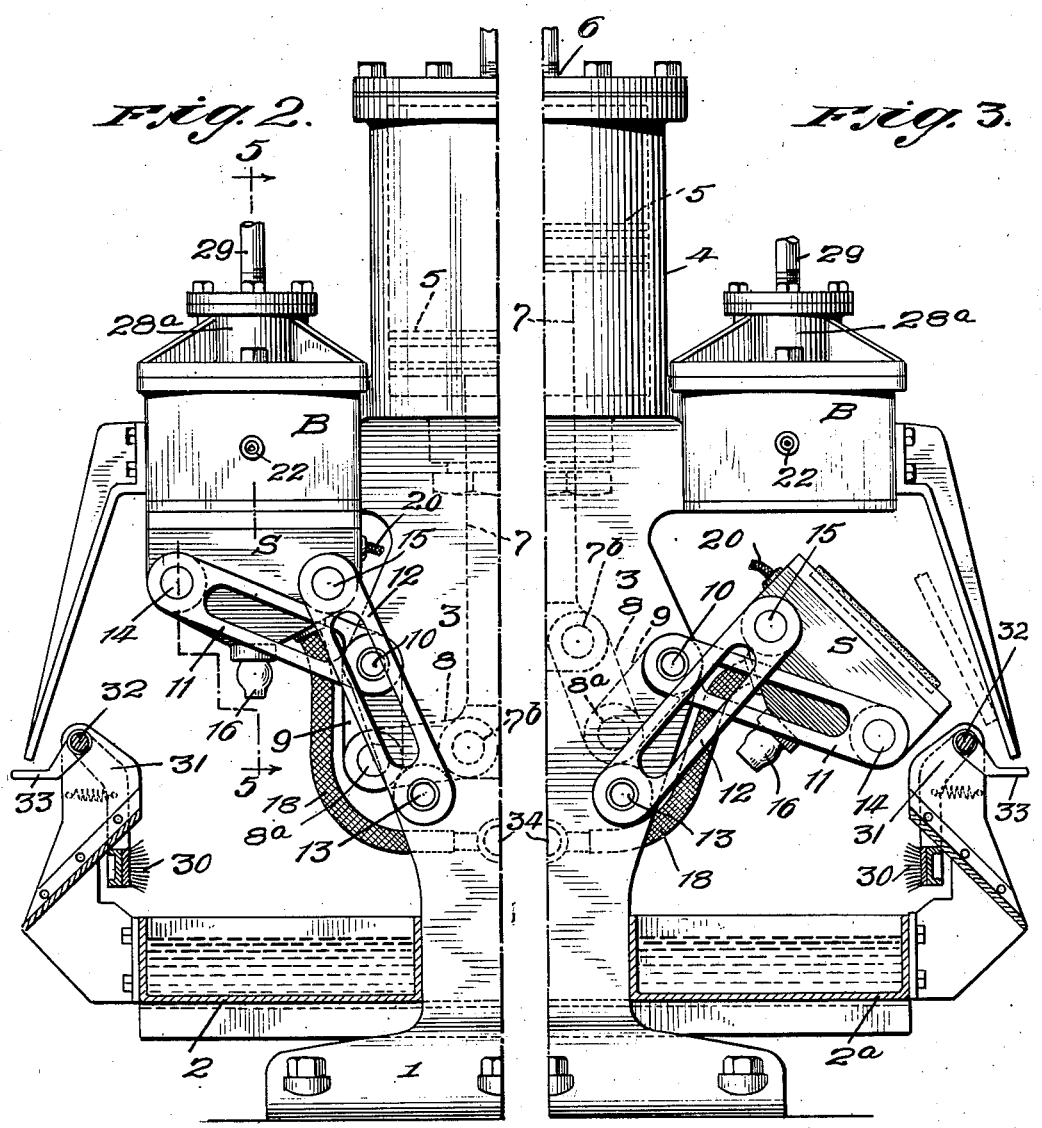

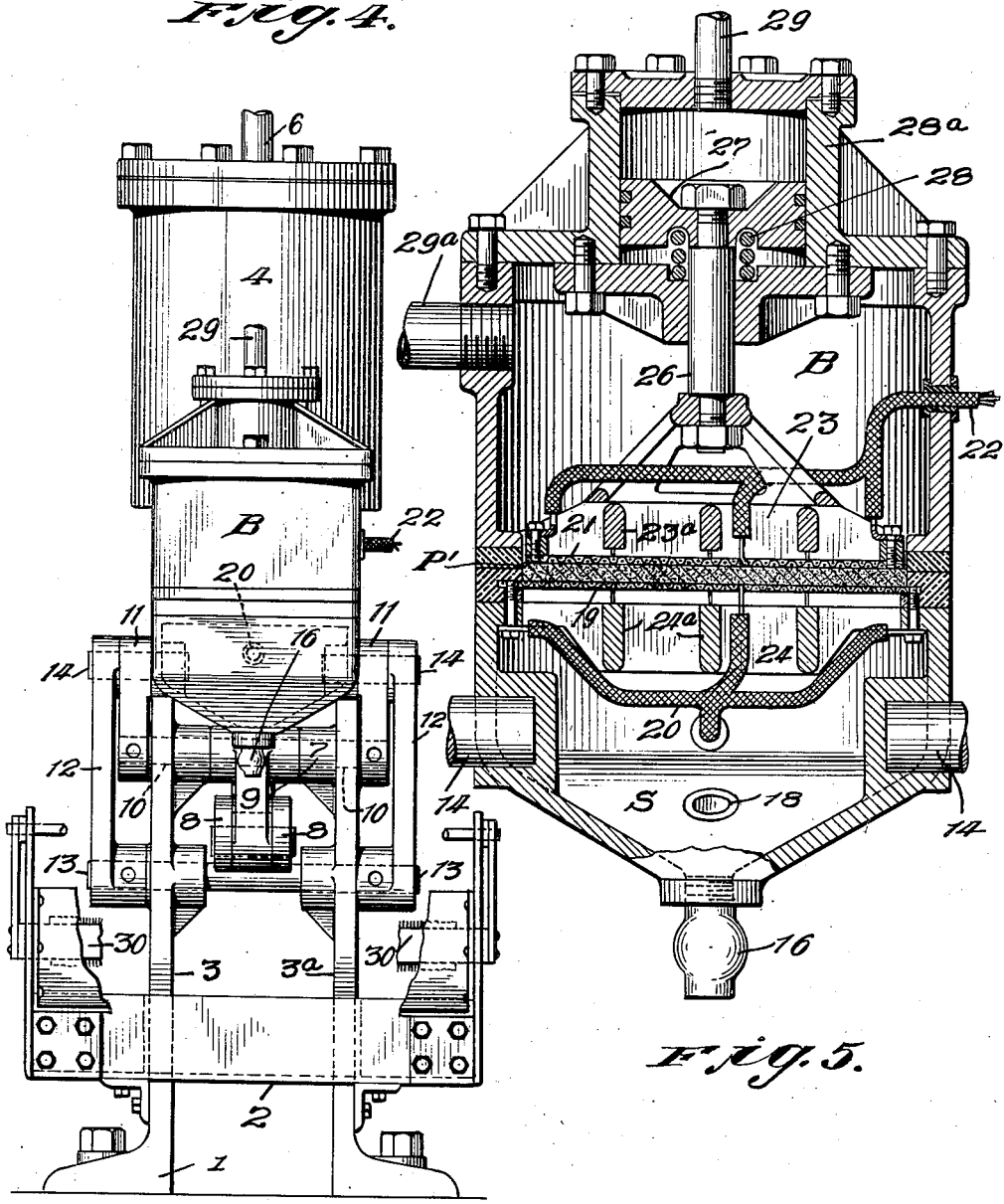

Oct. 4, 1932.  A. W. MORRIS  1,880,458

MECHANISM FOR AND METHOD OF MANUFACTURING PULP ARTICLES

Original Filed Feb. 5, 1929  7 Sheets-Sheet 4

INVENTOR
Albert W. Morris
BY
Mock & Blum
ATTORNEYS

Oct. 4, 1932.  A. W. MORRIS  1,880,458
MECHANISM FOR AND METHOD OF MANUFACTURING PULP ARTICLES
Original Filed Feb. 5, 1929   7 Sheets-Sheet 5
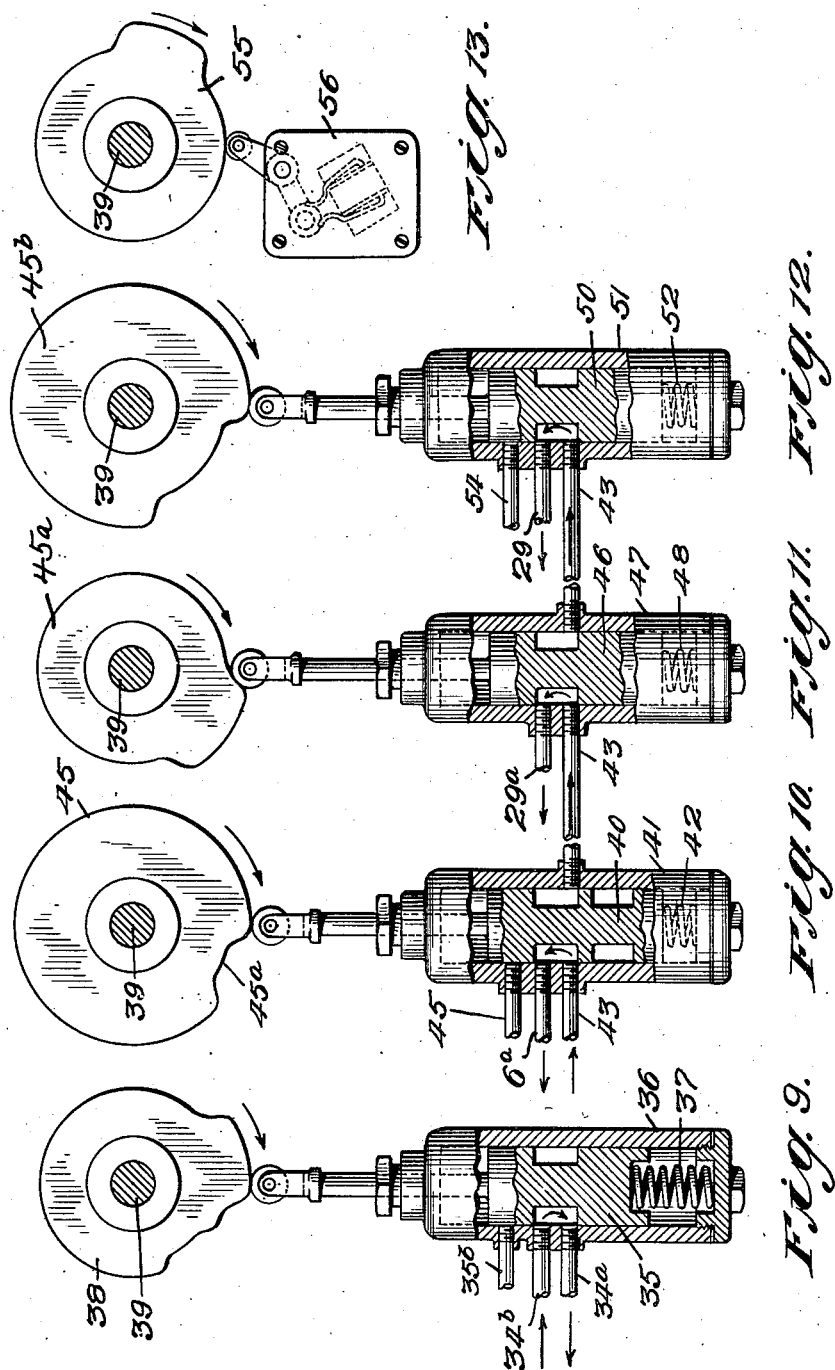
INVENTOR
Albert W. Morris
BY
Mock & Blum
ATTORNEYS

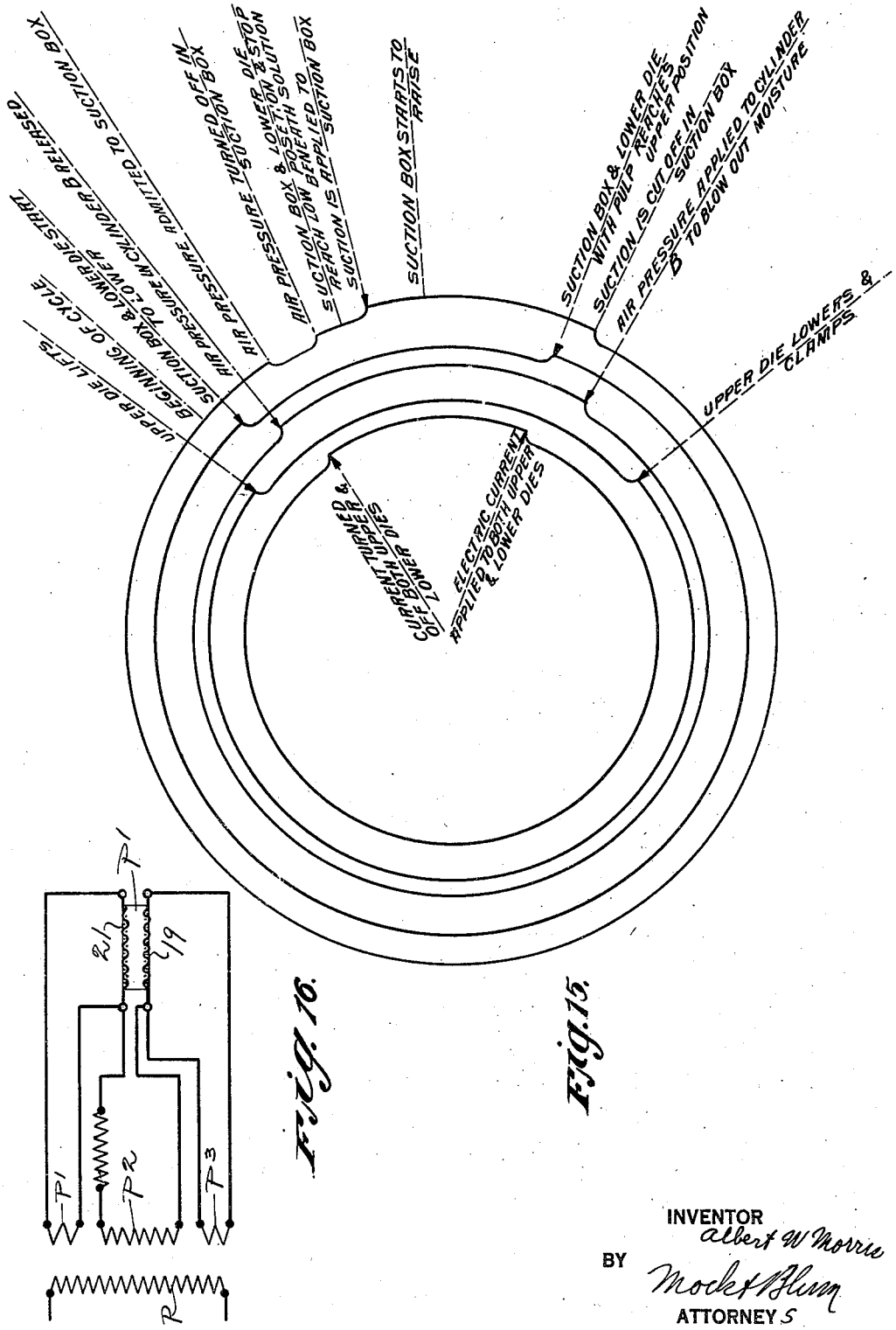

Patented Oct. 4, 1932

1,880,458

UNITED STATES PATENT OFFICE

ALBERT W. MORRIS, OF PHILADELPHIA, PENNSYLVANIA, ASSIGNOR TO GEORGE E. COBLENS, OF NEW YORK, N. Y.

MECHANISM FOR AND METHOD OF MANUFACTURING PULP ARTICLES

Application filed February 5, 1929, Serial No. 337,633. Renewed February 13, 1932.

My invention relates to a new and improved mechanism for and method of manufacturing pulp articles.

One of the objects of my invention is to provide a method whereby pulp articles can be readily formed into a predetermined shape or shapes.

Another object of my invention is to provide a method of and mechanism for this purpose which shall utilize suction, pressure, and heat.

Another object of my invention is to provide a machine for this purpose which can be capable of rapid and efficient operation.

Another object of my invention is to provide a method and mechanism for this purpose whereby a sheet of pulp can be dried and set by means of combined pressure and heat.

Another object of my invention is to provide a method of and mechanism for this purpose, whereby electric heat can be economically used.

Other objects of my invention will be set forth in the following description and drawings which illustrate a preferred embodiment thereof, it being understood that the above general statement of the objects of my invention is intended merely to generally explain the same and not to limit it in any manner.

Fig. 2 is an elevation, partially in section, of the left-hand side of Fig. 1 showing the parts in the position in which pulp is being compressed and heated.

Fig. 3 is a view of the right-hand side of Fig. 1 showing the parts in the position in which the pulp is ejected after having been set.

Fig. 4 is a side elevation.

Fig. 5 is a detail enlarged sectional view of the mechanism for heating and setting the pulp.

Fig. 9 shows the cam and accessory valve which control the aspiration of the pulp. In the position shown, the valve is set so as to cause the pulp to be taken up.

Fig. 10 shows the cam and associated valve which controls the mechanism for raising a mass of aspirated pulp.

Fig. 11 shows a cam and associated valve for controlling the supply of air admitted into the pressure chamber B, which is later more fully described.

Fig. 12 shows another cam and the valve associated therewith for controlling the mechanism for mechanically compressing the sheet of pulp.

Fig. 13 shows a cam and switch associated therewith for controlling the supply of current through the heating means.

Fig. 15 is a diagrammatic view showing the sequence in the operations of the various cams, and the respective periods of time during which they operate.

Fig. 16 is a diagrammatic view showing the circuit employed.

Figure 1:
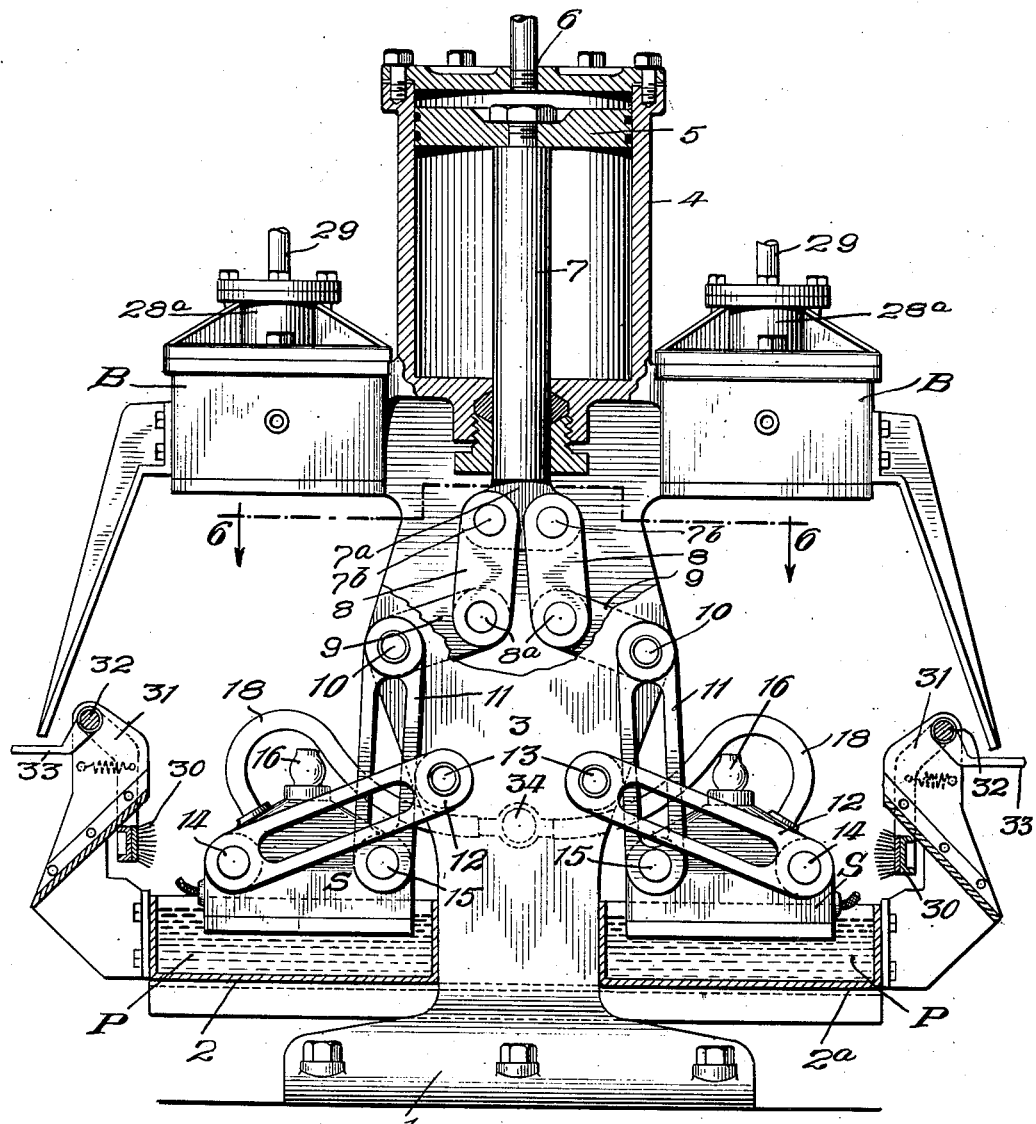
Fig. 1 is a front elevation partially in section of a machine which can be used to practice my invention. The parts are shown in the position in which pulp is being taken up from the supply tanks.
Figure 6:
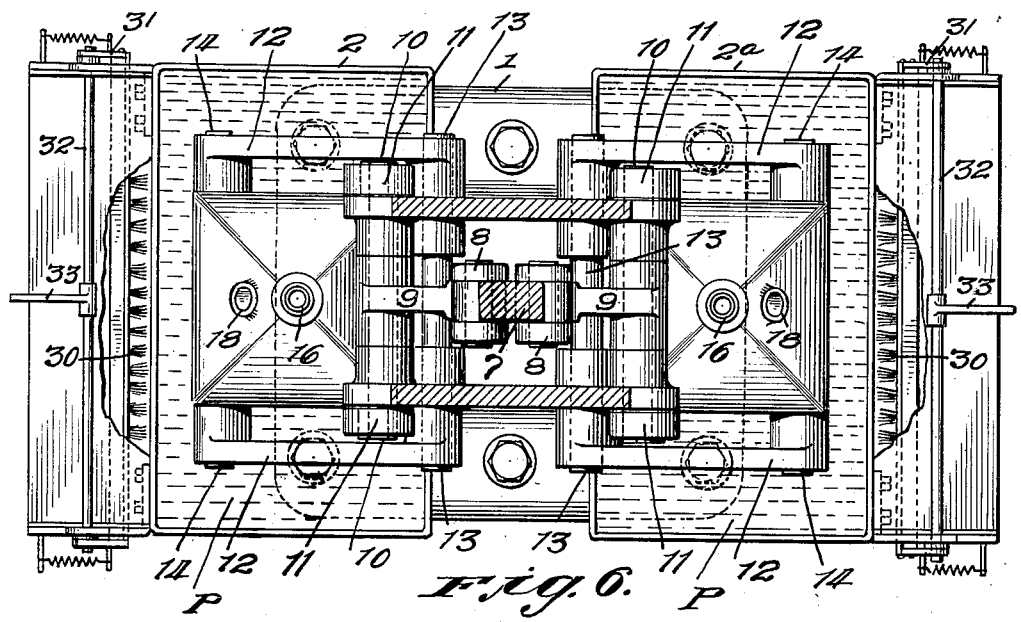
Fig. 6 is a sectional view on the line 6—6 of Fig. 1.
Figure 7:
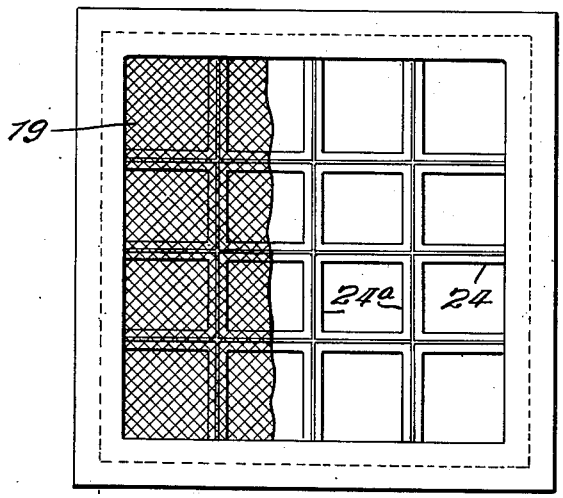
Fig. 7 is a detail plan view of a screen and its reinforcing frame.
Figure 8:
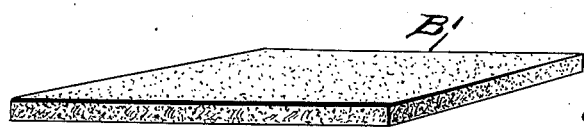
Fig. 8 is a perspective view of the completed sheet of pulp.

As shown in Fig. 1, the device is mounted upon a suitable base 1 upon which supply tanks 2 and 2a are located, said tanks containing the pulp or other cellulose material mixed with water. This mixture of pulp and water may be of any suitable type, which is used for making pulp articles, paper, or the like. The base 1 is provided with standards 3 and 3a. These standards 3 and 3a are either connected at their upper ends, or they are made of a single integral U-shaped casting or the like. A cylinder 4 is connected to the member connecting the tops of the standards 3 and 3a. A piston 5 is located in the cylinder 4 and said cylinder 4 is provided with an air-inlet pipe 6. The piston 5 is provided with a depending piston rod 7.

As shown in Fig. 1, the piston rod 7 is provided with an enlargement 7a at the bottom thereof. Links 8 are connected at their upper ends to the enlargement 7a by means of pivot pins 7b. These pivot pins 7b project through the enlargement 7a at the front and at the rear of the enlargement 7a. There are four of the said links 8, the said links 8 being arranged in two pairs, each pair of links 8 comprising one in front and one in back of the enlargement 7a. Each pair of links 8 is connected by means of a pivot pin 8a to an arm 9, of a bell-crank lever having another arm 11. Each said bell-crank lever is pivotally connected to the frame of the machine by means of a pivot pin 10. Each arm 9 of said bell-crank lever is located between the associated links 8. The arms 11 are slotted and each of them is connected by means of a pivot pin 15 to a suction chamber S.

Hence, as shown in Fig. 1, when the piston 5 is in its upper position, the suction chambers S are depressed until their bottoms are below the level of the pulp and water mixture P in the tanks 2 and 2a. When the piston 5 is depressed, each suction chamber S is tilted and raised, as indicated in Fig. 3. When the depression of the piston 5 is complete, each suction chamber S is caused to assume the position shown in Fig. 2. Each suction chamber S is provided with a water outlet 16. Hence while each suction chamber S is being moved to and while it is in the operative position, said operative position being shown in Fig. 2, surplus water can drop out of said suction chamber S.

Likewise, any loose pulp can drop back together with the water, into the corresponding supply tank which is then located underneath the suction chamber S. Each suction chamber S is connected by means of a flexible hose 18 to a suction pump or the like, which is rendered effective at a suitable time.

As shown in detail in Fig. 5, the bottom of each suction chamber S is formed by a sheet of wire mesh 19 which is preferably made of nichrome or other metal, which has a high resistance and which can withstand relatively high temperatures. The ends of this mesh bottom 19 are connected to a suitable source of electric current by means of a cable 20, in order to heat said mesh. A pair of conductors is located in the cable 20 for this purpose so that either a direct current or an alternating current can be passed through the sheet 19, before it is moved to the operative position shown in Fig. 5, so as to preheat said mesh 19 to the desired temperature. While I prefer to form the bottom of suction chamber S of wire mesh, I do not wish to exclude the use of any foraminous material through which air can be forced when the chamber S has its air pressure lowered, in order to collect the pulp.

As shown in Fig. 5, a third conductor located in the cable 20, is connected to the central point of the mesh bottom 19, or to any other suitable point thereof, for a purpose which will be later more fully described. In order to practically produce the electro-osmotic effect, hereinafter mentioned, it is desirable to have a large area of contact between the sheet of pulp and the respective sheets of mesh or the perforated or unperforated plates which contact therewith. If these mesh members are made of thick wires such as copper, nickel, or other material having a high conductivity, they may become so hot as to scorch the surfaces of the pulp article which is being formed, which is highly undesirable. By using high resistance, material, such as nichrome, a large area of contact can be provided between the sheets of pulp and the metal members in contact therewith, without overheating said metal members. The electro-osmotic effect drives the moisture out of the interior of the sheet of pulp, and the surfaces of the sheet of pulp are sufficiently heated by the use of high resistance material to thoroughly dry and set the pulp, without burning it and without producing arcs through the material.

The pressure in the suction chamber S is reduced to cause a layer of pulp to adhere thereto, before it is lifted out of the corresponding supply tank, and this suction is maintained until the bottom of the suction chamber S has turned either 180° or has been sufficiently turned to prevent the pulp from dropping off.

Each side of the apparatus is provided with a compression chamber B. As shown in detail in Fig. 5, the bottom of each compression chamber B is formed of wire mesh 21, which is similar to and may be identical with the wire gauze 19. A pair of conductors located in the cable 22 are likewise connected to the poles or terminals of a source of electric current and to the ends of the mesh 21. Hence, the mesh 21 can be heated for a sufficient period of time before the same becomes operative to heat and set a sheet of pulp.

As shown in Fig 5, a third conductor located in the cable 22 is connected to the central point (or any other suitable point) of the mesh 21, for a purpose which will be later more fully described.

Since the sheet of pulp is subjected to considerable pressure between the upper and lower meshes, it is necessary to prevent the upper sheet of mesh 21 from buckling. The pressure chamber B is provided with a movable frame 23 to which the upper sheet of mesh 21 is connected, and this movable frame 23 is provided with lateral reinforcing arms 23a. Likewise, the bottom sheet of mesh 19 is correspondingly provided with or mounted upon a skeleton reinforcing frame 24 having lateral arms 24a. The frame 23 is mounted upon a piston rod 26 which is connected to a piston 27 located in the pressure cylinder 28a. Air under pressure is supplied through the pipe 29. This air under pressure actuates piston 27 which forces the frame 23, together with the gauze 21 downwardly with considerable force to compress the sheet of pulp P' and squeeze out some of the remaining water therein, which falls out of the outlet 16. This mechanical pressure produces a very intimate contact between the wire mesh dies and the pulp, because the wires are imbedded in the pulp, as shown in Fig 16. A compression spring 28 which has an abutment connected to the top of the pressure chamber B, normally holds the piston 27 in a position in which the mesh 21 is held above the operative position shown in Fig. 5. Since the pulp has been collected on the mesh 19 by means of suction, the pulp fibres so collected have become interlaced to some extent so that when pressure is applied to the pulp, it will not be forced through the openings in mesh 19 and mesh 21. When the suction is first applied, a certain amount of pulp passes through the mesh 19, but the pulp soon compacts so as to form a layer which can withstand the subsequent pressure.

In order to clean each bottom sheet of mesh 19, brushes 30 are employed Each brush 30 is mounted upon the bottom of a lever 31 pivoted at 32 to the frame of the machine. By downwardly moving the handle 33, each brush 30 can be moved inwardly into operative position. This handle 30 can be actuated by hand, or by any suitable automatic means, to clean the associated mesh 19 upon each downward movement thereof.

As shown in Fig. 16, electric current may be supplied to the primary coil P of a transformer. This alternating current may be the ordinary current supplied to a light circuit. For example, it may have a frequency of sixty cycles per second. The said transformer has three secondary coils P', P², and P³. The secondary coil P³ may be connected to the conductors in the cable 20, which supply the heating current to the mesh 19. The secondary coil P' may be connected to the pair of conductors located in the cable 22 which supply the heating current to the mesh 21. The third secondary coil P² (whose circuit may include a suitable adjustable resistance) is connected to the third pair of conductors. It is clear that the circuit of the third secondary coil P² will not be closed until the wire mesh dies 19 and 21 are in contact with the sheet of moist pulp P'. The current delivered by the third secondary coil P² then operates to send an alternating current through the sheet of wet pulp P' which is then horizontally located. Experience has shown that this alternating current acts to drive moisture to and out of the underside of the sheet of pulp P' so that said sheet of pulp is more quickly and efficiently dried and set, than if a heating effect at a surface or surfaces was solely relied upon.

Figure 14:
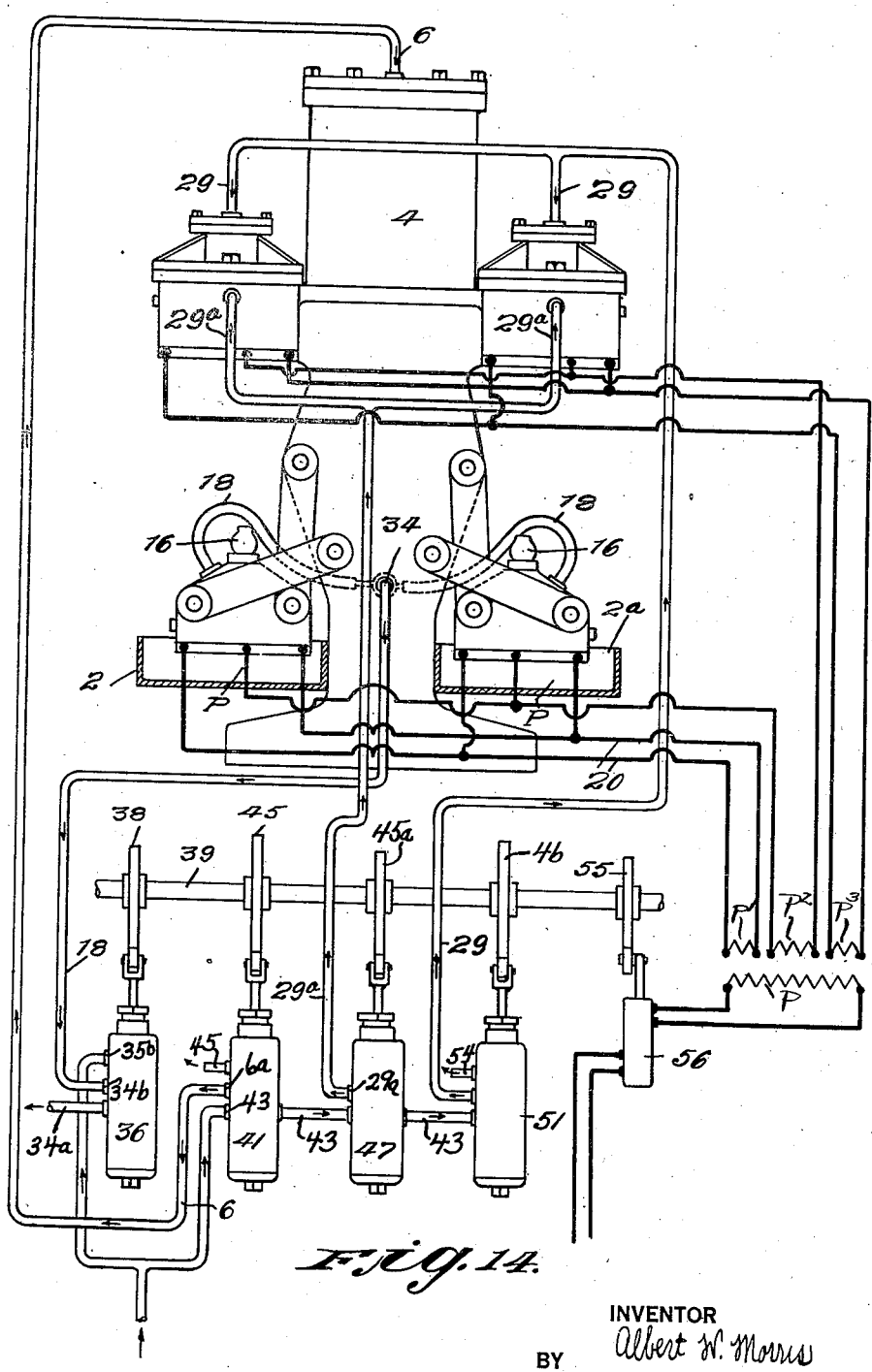
Fig. 14 is a general diagrammatic assembly view of the machine.

As shown in Fig. 14, the supply of current to the primary coil P is controlled by the switch 56.

As shown in Fig. 15, a complete cycle in the operation of the machine is as follows:—

Assuming that each suction box and its associated sheet of mesh, (said mesh being designated in Fig. 15 as a "die") are in the upper position shown in Fig. 5, the piston 5 is raised by exhausting the air from the cylinder 4 through the pipe 6. After each suction box has thus been lowered for a short distance, the air pressure in each compression cylinder is released by discontinuing the supply of air under pressure through the pipes 29a. After each suction chamber S has been lowered an additional short distance, air under pressure is admitted thereto by means of the flexible hose or pipe line 18 so that the sheet of pulp is moved away therefrom, as indicated in dotted lines in Fig. 3. The sheets of pulp which have been thus blown away from the suction chambers, are caused to move into a suitable chute or the like. After the suction chambers S have been lowered for another short distance, the supply of air under pressure is discontinued. The piston 5 now reaches its top position in the cylinder 4 so that each suction box or chamber and its associated sheet of mesh reach their lowermost position and stop below the mixture of pulp and water, this mixture being designated in Fig. 15 as "solution".

Each chamber S is now subjected to suction, while it is held in its lowermost position. This suction is maintained for a sufficiently long period of time until a layer of pulp has been caused to adhere to the mesh or porous bottom 19 of each suction chamber. It is to be understood that Fig. 15 designates the time for each operation or movement in the machine. After the suction has been applied to each chamber S for a sufficient period of time, air under pressure is admitted into the cylinder 4, to lower the piston 5 and to raise the suction chambers S. Each suction chamber or box and its die, together with the adhereing pulp, is now moved into the upper or operative position shown in Fig. 5. Suction is now cut off in each suction chamber S. However, each preliminary mass of pulp is dried and rendered coherent to a certain extent, by the air current produced by said suction, so that this preliminary mass of pulp can withstand the subsequent action of the air current, and the mechanical pressure.

Compressed air is now supplied to each chamber B by means of a suitable pump, blower or the like, to produce an air current which passes downwardly out of each chamber B, to blow out as much moisture as possible from each sheet of pulp. After the air pressure has been maintained for a suitable period of time in each chamber B, air under pressure is admitted to each cylinder 28a, to cause each piston 27 and the associated frame 23 and upper mesh 21 to descend and exert considerable pressure upon the sheet of pulp. The pressure exerted on the pulp may be as high as 2000 pounds per square inch, but a pressure of 120 to 150 lbs. per square inch is ordinarily sufficient. The air pressure is gradually increased from zero to prevent the pulp from being blown through the mesh. This air current is equally applied to the sheet of pulp P' to blow the water downwardly in the form of a fine spray, and out of outlet 16.

It may be noted that electric current is supplied to the upper and lower dies, or sheets of mesh 19 and 21, as soon as and before the suction boxes reach their upper positions. Hence said sheets of mesh 19 and 21 are heated before the air current and the mechanical pressure are applied to the pulp. The sheets of pulp are therefore simultaneously subjected for a sufficient period of time to a powerful blowing action, and to the pressure produced by the compressed air in the cylinders 28a. Since compressed air is positively forced through the moist pulp by means of a pump or the like, it is possible to use a much higher air pressure than the air pressure which is produced by a suction device even if the suction device is of the most efficient type. It is possible to force the air or other drying fluid through the mass of pulp with a pressure as high as 80–120 pounds per square inch, and even more, dependent upon the thickness of the pulp. An additional advantage of the process specified herein is that it is not necessary to use excessive mechanical pressure on the pulp which might break down the fiber of the cellulose. Likewise, the application of direct heat to the wires which are imbedded in the pulp, either partially or wholly, renders the efficiency of the process largely independent of atmospheric conditions. As soon as the hot mesh dies 19 and 21 contact with the sheet of moist pulp, held in horizontal position, the alternating current passes through the same so that an electro-osmotic effect is exerted without electrolyzing the water in the pulp. I do not wish to exclude the use of a direct current for heating the dies 19 and 21, and for exerting this electro-osmotic effect, but I prefer to use an alternating current, in order to eliminate electrolysis. Experience has shown that using an alternating current having a frequency of sixty cycles per second, practically eliminates electrolysis. Then the supply of compressed air to the cylinders 28a is discontinued, and said cylinders 28a are connected to a suitable suction pump to cause the pistons 27 to move upwardly. This completes a cycle. However, it may be noted that the supply of air under pressure in each cylinder B is not discontinued until shortly after the suction chambers have begun to descend. Likewise, the current supplied to the mesh sheets 19 and 21 is not discontinued until shortly after the supply of air under pressure to the cylinders B has been discontinued.

Each complete cycle takes about twenty to thirty seconds although I do not wish to restrict myself to any definite time, as this may vary with the kind of pulp and the kind of article to be manufactured.

The valve control for automatically producing the above mentioned operations is shown more particularly in Figs. 9–14 inclusive. As shown in Figs. 9 and 14, the suction pipes 18 which are connected with the suction chambers S, are connected to a main flexible suction pipe 18 which is connected to the inlet pipe 34b of a valve casing 36 in which a piston valve 35 is slidably mounted. A compression spring 37 tends to move the piston valve 35, above the position indicated in Fig. 9. The pipe 34a is connected to a suitable suction pump, which is not shown in the drawings. When the parts are in the position shown in Fig. 9, the pipes 34b and 34a can communicate with each other so that the suction pump connected to the pipe 34a, can operate to maintain the chambers S under suction. However, when the cam 38, which is mounted upon the cam shaft 39, is turned to release the upper end of the rod of the valve 35, then the valve 35 is moved upwardly by the compression spring 37 so that the pipes 34b and 35b can communicate with each other. As shown in Figs. 9 and 14, the pipes 35b communicate with a pressure pump, blower or other suitable means for supplying air under pressure. As shown in Fig. 9, the cam 38 is so designed so that pressure is not supplied to the suction chambers S immediately after they have been disconnected from the suction pump. The cam 38 is so designed as to produce the sequence of operations shown in Fig. 15, and during the periods shown in said Fig. 15.

The valve 40 shown in Fig. 10 operates to cause air under pressure to be supplied to the cylinder 4 through its inlet pipe 6, or to produce a vacuum in said cylinder 4. This valve 40 is slidably mounted in the valve casing 41, and it is provided with a compression spring 42, which tends to move it above the position indicated in Fig. 10.

As shown in Figs. 10 and 14, the valve casing 41 is supplied with an inlet pipe 43 which is connected to a source of compressed air. The valve casing 41 is also provided with a port 6a which is connected to a pipe 6 connected to the cylinder 4. The pipe 45 is connected to an exhaust pump which is not shown in the drawings.

When the valve 40 is in the position shown in Fig. 10, air under pressure is supplied to the inlet pipe 6 so that the piston 5 is caused to rapidly descend. The position of the valve 40 is controlled by the cam 45 which is mounted upon the common cam shaft 39. When the cam 45 is turned so that the roller on top of the rod of the valve 40 is free to enter the recess 45a, then the compression spring 42 moves the valve 40 upwardly so that the pipes 6a and 43 are no longer in communication, and the pipes 6a and 45 are placed in communication with each other. The exhaust pump connected to the pipe 45 now becomes operative to exhaust air from the cylinder 4, so as to raise the piston 5, and to depress the suction chambers S.

The valve 46 which is shown in Fig. 11 regulates the supply of compressed air to the chambers B, to force air through the sheets of pulp so that water is forced out of the lower surfaces thereof in the form of fine streams. This valve 46, which is also of the piston type, is slidably mounted in a casing 47. The pipe 43 is connected to a source of air under pressure. When the valve 46 is in the position indicated in Fig. 11, the pipe 29a is supplied with air under pressure, and this pipe 29a is provided with branches connected to the chambers B. The valve 46 is controlled by means of the cam 45a, mounted upon the common cam shaft 39, and by the compression spring 48.

The supply of air to the cylinders 28a is controlled by the piston valve 50 which is mounted in the casing 51. A compression spring 52 tends to raise the valve 50 above the position indicated in Fig. 12. Air under pressure is supplied to the pipe 43. When the valve 50 is in the position shown in Fig. 12, said air under pressure passes to the pipes 29, which then are in communication with the pipe 43.

The valve 50 is controlled by the cam 45b mounted on the cam shaft 39. When the valve 50 is free to move upwardly, the communication between pipes 29 and 43 is cut off, and communication is established between the pipes 29 and the pipe 54. Said pipe 54 is connected to a suitable suction pump or the like.

The cam 55 for controlling the switch 56, is also mounted on the common cam shaft 39.

It will be noted that both sides of the machine are symmetrical. Likewise, while the machine has been shown with two operating units, any suitable number of units could be supplied. It will also be noted that the machine is free from any cams, save for the cams necessary to control the pilot valves 35, 40, 46 and 50, and the cam for controlling the switch.

The mesh members 19 and 20 are preferably made of No. 12 nichrome wire.

The members 16 are provided with check valves (not illustrated in the drawings) which operate to close the same while said chambers S are under suction. However, when air under pressure is forced into the suction chambers S, the check valves are then free to open to permit water, pulp, etc. to escape therefrom.

I have specifically illustrated the manufacture of a flat or planar sheet of pulp. However, it is obvious that the machine is applicable for manufacturing various kinds of pulp articles, such as dishes, baskets, or the like. In making articles of various shapes, it is merely necessary to suitably alter the shape of the dies 19 and 21.

I have shown a preferred embodiment of my invention, but it is clear that numerous changes and omissions can be made without departing from the spirit of my invention.

I claim:

1. In the art of forming a pulp article, those steps which consist in forcing air through a moist mass of pulp while simultaneously heating the pulp by a source of heat independent of the air current, the temperature of said source of heat being higher than the temperature of the air current.

2. In the art of forming a pulp article, those steps which consist in simultaneously applying heat and pressure to a moist mass of pulp while forcing an air current through the same, the heat so supplied being from a source independent of said air current, the temperature of the source of heat being higher than the temperature of the air current.

3. In the art of making a pulp article, those steps which consist in collecting a layer of pulp upon the face of a suction chamber by withdrawing the air out of said chamber, and then raising said chamber while causing it to turn so that the sheet of pulp thus collected can rest upon the adjacent face of the chamber by gravity, said adjacent face being then below the sheet of pulp, and means adapted to subsequently compress the pulp.

4. In a machine for forming a pulp article, the sub-combination of a tank adapted to contain a mixture of pulp and water, a suction box having an operative foraminous face, means adapted to connect said suction box to a vacuum pump or the like for producing suction therein, means adapted to raise and lower said suction box so that it is lowered into said tank while said operative face is in the bottom position, so that a layer of pulp can then be collected adjacent said operative face, and means adapted to turn said suction box when it is raised so that said perforated face then occupies an upper horizontal position, below the layer of pulp so that the said sheet of pulp then rests upon said operative face, and means adapted to then compress the pulp.

5. In a machine for forming a pulp article, the sub-combination of a tank adapted to contain a mixture of pulp and water, a suction box having an operative foraminous face, means adapted to connect said suction box to a vacuum pump or the like for producing suction therein, means adapted to raise and lower said suction box so that it is lowered into said tank while said operative face is in the bottom position, so that a layer of pulp can then be collected adjacent said operative face, and means adapted to turn said suction box when it is raised so that said operative face then occupies an upper horizontal position, below the layer of pulp so that the said sheet of pulp then rests upon said operative face, said suction box having a water-outlet therein, and means adapted to compress the pulp after the said open face has been turned as previously stated herein.

6. In a machine for forming a pulp article, the sub-combination of a tank adapted to contain a mixture of pulp and water, a suction box having an operative foraminous face, means adapted to connect said suction box to a vacuum pump or the like for producing suction therein, means adapted to raise and lower said suction box so that it is lowered into said tank while said operative face is in the bottom position, so that a layer of pulp can then be collected adjacent said operative face, and means adapted to turn said suction box when it is raised so that said operative face then occupies an upper horizontal position, below said layer of pulp so that the said layer of pulp then rests upon said operative face, said suction box having a water-outlet therein, said suction box being operated to raise said water-outlet in alignment with said tank, and means adapted to compress the pulp after the said open face has been turned as previously stated herein.

7. In a machine for forming a pulp article, the sub-combination of a frame, a tank connected to said frame, and adapted to contain a mixture of pulp and water, a suction box adapted to enter the said tank and to move out therefrom, a lever pivotally connected to said suction box at one end and having its other end connected to the frame, means adapted to turn said lever so as to swing said suction box away from said frame, and a link pivotally connected at one end to said frame, and at its other end to said suction box so that said suction box is caused to turn 180° when it is raised.

8. In a machine for forming a pulp article, the sub-combination of a tank adapted to contain a mixture of pulp and water, a vertically movable and turnable suction box having an operative foraminous face adapted to receive a layer of pulp, means adapted to withdraw air from said chamber while said operative face contacts with the mixture of pulp and water, so that a layer of pulp is formed adjacent said operative face, means adapted to raise and turn the suction chamber so that the operative face is horizontal and is below the layer of pulp which can then rest upon said operative face, and means adapted to then exert mechanical pressure upon said sheet of pulp, while it rests upon said operative face.

9. In a machine for forming a pulp article, the sub-combination of a tank adapted to contain a mixture of pulp and water, a vertically movable and turnable suction box having an operative foraminous face adapted to receive a layer of pulp, means adapted to withdraw air from said chamber while said operative face contacts with the mixture of pulp and water, so that a layer of pulp is formed adjacent said operative face, means adapted to raise and turn the suction chamber so that the operative face is horizontal and is below the layer of pulp which can then rest upon said operative face, and means adapted to then exert mechanical pressure upon said sheet of pulp, said suction chamber having a water outlet which is aligned with said tank while said mechanical pressure is being applied.

10. In a machine for forming a pulp article, the sub-combination of foraminous members adapted to receive a mass of pulp between them, means adapted to cause a relative movement between said foraminous members to exert mechanical pressure on the mass of pulp, and means adapted to force air through the sheet of pulp while it is being subjected to said mechanical pressure, at least one of said foraminous members being connected to a source of electric current to heat the same.

11. In a machine for forming a pulp article, a tank adapted to contain a mixture of pulp and water, a suction box having a foraminous operative face provided with, means adapted to depress said operative face into said tank so that a layer of pulp can be collected thereon, means adapted to raise and turn said suction box so that the operative face is horizontally below and supports the layer, a second vertically movable foraminous member, means adapted to actuate said second foraminous member to exert pressure on the pulp resting upon the first foraminous member, and means adapted to force air through said mass of pulp, while it is held between said foraminous members.

12. In a machine for forming a pulp article, a tank adapted to contain a mixture of pulp and water, a suction box having a foraminous face, means adapted to depress said foraminous face into said tank so that a layer of pulp can be collected thereon, means adapted to raise and turn said suction box so that the layer of pulp rests upon said foraminous face, a second vertically movable foraminous member, means adapted to actuate said second foraminous member to exert pressure on the pulp resting upon the first foraminous member, and means adapted to force air through said mass of pulp, and means adapted to heat at least one of said foraminous members.

13. In a machine for forming a pulp article, the sub-combination of foraminous members adapted to receive a mass of pulp between them, means adapted to cause a relative movement between said foraminous members to exert mechanical pressure on the mass of pulp, and means adapted to force air through the mass of pulp while it is being subjected to said mechanical pressure, said foraminous members being connected to a source of electric current to heat the same, said foraminous members being also connected to an additional source of electric current so that current from said additional source can pass through the mass of pulp held between them.

14. In a machine for forming pulp articles comprising a tank adapted to contain a mixture of pulp and water, said machine having a frame, a suction chamber pivotally connected to a lever which is pivotally connected to said frame, a link pivotally connected to said frame and also pivotally connected to said suction box so that said suction box is caused to turn when said lever is operated to swing said suction box upwardly, and a cylinder having a piston connected to said lever to actuate the same.

15. In a machine for forming pulp articles, the combination of a member having a supporting face, means adapted to deposit a layer of pulp on said supporting face, and means adapted to force a foraminous heating member which comprises electrical conducting means against said layer of pulp, so that said electrical conducting means are placed in direct and intimate contact with the layer of pulp to heat the same.

16. In the art of forming a pulp article, those steps which consist in applying mechanical pressure to a moist mass of pulp to compact the same, and forcing a current of drying fluid through said mass while it is subjected to said mechanical pressure, in order to remove the moisture which is forced to the surface of the pulp by said mechanical pressure, while permitting the escape of the moisture which is forced out of and away from said pulp by said mechanical pressure and said current of fluid, said moisture being forced out and being caused to escape while it is in liquid form.

17. A method of forming a pulp article which consists in collecting a layer of moist pulp upon a screen while causing the pulp fibres to partially inter-connect, then forcing a current of aeriform drying fluid through the moist mass of pulp to blow out moisture therefrom, then applying mechanical pressure to said moist mass on both sides thereof, and continuing to force an aeriform drying fluid through the same while said pressure is applied.

18. In a machine for forming a pulp article, a perforated member, means adapted to produce suction on one side of said perforated member in order to collect a layer of moist pulp on the other side thereof, a second perforated member, means adapted to cause a relative movement between said perforated members in order to exert mechanical pressure on the mass of pulp, and means adapted to force a current of aeriform drying fluid through the sheet of pulp while it is being subjected to said mechanical pressure.

19. A method of forming a pulp article which consists in forming a mass of moist pulp having sufficient coherence to substantially withstand mechanical pressure and pressure which is produced by forcing a current of aeriform fluid through the same, and then simultaneously applying to said moist mass, mechanical pressure and a current of aeriform fluid which is forced through said mass, and simultaneously permitting the escape of moisture which is removed from the moist pulp by said pressure and by said current of aeriform fluid.

20. A method of forming a pulp article which consists in forming a mass of moist pulp having sufficient coherence to withstand the action of mechanical pressure and the action of a current of drying fluid which is forced through the said mass, and then applying mechanical pressure to the moist mass of pulp in order to compact the same, and forcing a current of drying fluid through and forcing it is being subjected to said said mass while it is being subjected to said mechanical pressure, and permitting the escape in liquid form of the moisture which is so removed from said mass of pulp.

21. A method of forming a pulp article which consists in collecting a layer of moist pulp upon a screen by means of suction so that the pulp fibres are partially interconnected, partially drying said moist pulp by means of a current of aeriform drying fluid, and then forcing the moisture out of said moist pulp by means of mechanical pressure and by a current of aeriform drying fluid which is forced through said mass of pulp.

22. A method of forming a pulp article which consists in forming a layer of moist pulp upon a screen, forcing a current of aeriform drying fluid through the moist mass of pulp while it is supported upon said screen, the force of said current of fluid being gradually increased in order to prevent the pulp from being blown through the screen, and also using mechanical pressure to dry the said mass of pulp.

In testimony whereof I affix my signature.

ALBERT W. MORRIS.